(12) United States Patent
Brambach et al.

(10) Patent No.: US 11,571,778 B2
(45) Date of Patent: Feb. 7, 2023

(54) PROCESS FOR OPERATING A VIRTUAL SENSOR FOR DETERMINING THE CONDITION OF A TOOL HOLDER ON A TOOL MACHINE; VIRTUAL SENSOR FOR DETERMINING THE CONDITION OF A TOOL HOLDER AND TOOL MACHINE

(71) Applicant: POINT 8 GMBH, Dortmund (DE)

(72) Inventors: Tobias Brambach, Dortmund (DE); Kevin Dungs, Dortmund (DE); Sebastian Schneider, Dortmund (DE); Julian Surmuann, Kamen (DE); Kai Brugge, Bochum (DE)

(73) Assignee: POINT 8 GMBH, Dortmund (DE)

( * ) Notice: Subject to any disclaimer, the term of this patent is extended or adjusted under 35 U.S.C. 154(b) by 395 days.

(21) Appl. No.: 16/865,446

(22) Filed: May 4, 2020

(65) Prior Publication Data

US 2020/0361048 A1    Nov. 19, 2020

(30) Foreign Application Priority Data

May 15, 2019   (DE) .......................... 102019112775.0

(51) Int. Cl.
*B23Q 15/28* (2006.01)
*B23Q 17/09* (2006.01)
*B23Q 17/00* (2006.01)
*B23Q 17/20* (2006.01)

(52) U.S. Cl.
CPC ......... *B23Q 15/28* (2013.01); *B23Q 17/0961* (2013.01); *B23Q 17/005* (2013.01); *B23Q 17/09* (2013.01); *B23Q 17/20* (2013.01); *G05B 2219/37537* (2013.01)

(58) Field of Classification Search
CPC ................ G05B 19/401; G05B 19/404; G05B 2219/37225; G05B 2219/37537
USPC .......................................................... 700/174
See application file for complete search history.

(56) References Cited

U.S. PATENT DOCUMENTS

| 7,933,679 B1 | 4/2011 | Kulkarni et al. |
| 2007/0016325 A1 | 1/2007 | Esterling |
| 2022/0011183 A1* | 1/2022 | Stangl ...................... H04Q 9/00 |

FOREIGN PATENT DOCUMENTS

KR   101473580 B1 * 12/2014

OTHER PUBLICATIONS

Machine Translation, KR 101473580 B1. (Year: 2014).*
German Examination Report in corresponding German Application No. 102019112775.0, dated May 6, 2020.
European Search Report in corresponding European Application No. 20171193.4, dated Nov. 11, 2020.

(Continued)

*Primary Examiner* — Nicole N Ramos
(74) *Attorney, Agent, or Firm* — Hamre, Schumann, Mueller & Larson, P.C.

(57) ABSTRACT

A process for operating a virtual sensor for determining the condition of a tool holder on a tool machine, such as a spindle, and the condition of a tool machine which has at least one tool holder and at least one tool, attached or attachable to the tool holder, which allows a workpiece to be processed by running a machine program, and which has at least one control unit comprising at least one sensor.

13 Claims, 2 Drawing Sheets

(56) References Cited

OTHER PUBLICATIONS

Roland Larek et al., A Discrete-Event Simulation Approach to Predict Power Consumption in Machining Processes, Production Engineering Research and Development, Springer-Verlag, Berlin/Heidelberg, Bd. 5, Nr. 5, Jul. 14, 2011, pp. 575-579.
Viktor P. Astakhov et al., Cutting Force Evaluation Based on Total Energy Consumption, Seiten, Apr. 14, 2008, pp. 1-12.
Eberhard Abele et al., Holistic Simulation Environment for Energy Consumption Prediction of Machine Tools, Procedia Cirp, Bd. 29, Jan. 1, 2015, pp. 251-256.

\* cited by examiner

PROCESS FOR OPERATING A VIRTUAL SENSOR FOR DETERMINING THE CONDITION OF A TOOL HOLDER ON A TOOL MACHINE; VIRTUAL SENSOR FOR DETERMINING THE CONDITION OF A TOOL HOLDER AND TOOL MACHINE

CROSS REFERENCE OF RELATED APPLICATIONS

This application claims the benefit of German application DE 10 2019 112 775.0, filed May 15, 2019, and is incorporated by reference herein.

The invention refers to a process for operating a virtual sensor for determining the condition of a tool holder on a tool machine, and a virtual sensor for determining the condition of a tool holder and a tool machine.

BACKGROUND

When working with tool machines, workpieces, also known as semi-finished products, are machined by tools on tool machines. Here, the tools are clamped in a tool holder, e.g. a spindle, on the tool machine.

The radial forces acting on the tool holder (forces perpendicular to the axis of rotation of the tool holder), e.g. on the spindle, during processing of workpieces are dependent on a number of parameters. Restricting these forces to a level which the tool machine can easily withstand is a key criterion when writing machine programs for processing workpieces. Where the limits set for these radial forces are permanently or repeatedly exceeded, this can lead to the tool holder becoming damaged or destroyed.

On known tool machines, measuring the forces acting on the tool holder directly is laborious, hence on known tool machines the radial forces acting on the tool holder cannot be referred to for controlling the tool machine. Moreover, there exist some known tool machines where the use of additional sensors allows the forces acting on the tool holder to be measured directly.

This proves to be laborious and cost-intensive.

SUMMARY OF THE INVENTION

One task of a design example of the invention is to propose a process for operating a virtual sensor, a virtual sensor which can be operated using such a process, and a tool machine which will make it easier to record the forces acting on the tool holder.

This task is solved by a process for operating a virtual sensor for determining the condition of a tool holder on a tool machine, such as a spindle, and the condition of a tool machine which has at least one tool holder and at least one tool attached or attachable to the tool holder, which allows a workpiece to be processed by running a machine program, and which has at least one control unit comprising at least one sensor using the following steps:

a. Recording at least one, in particular time-dependent, piece of body data of the workpiece, the tool, the tool holder, and/or at least one drive axle, such as material and/or geometry;
b. Recording at least one piece of time-dependent room data of the workpiece, the tool, the tool holder, and/or at least one drive axle, such as the position and/or orientation relative to an inert coordinate origin of the tool machine;
c. Recording at least one piece of time-dependent operating data, such as feed speed, RPM or rotational speed of the tool holder, and/or recording a least one electrical current, in particular one generating a moment, of the tool holder and/or of at least one drive axle;
d. Recording the time-dependent real total energy intake of one or more steps in the machine program using a least one of the control unit's sensors, and calculating the time-dependent, virtual total energy intake of one or more steps using a virtual simulation of the machine program run by the control unit based on the body data, room data, and operating data recorded; and
e. Recording or calculating the radial forces acting on the tool holder, at least as the difference between time-dependent real total energy intake and time-dependent virtual total energy intake from the control unit.

Since the radial forces acting on the tool holder are calculated as the difference between time-dependent real total energy intake and time-dependent virtual total energy intake from the control unit, no additional sensor is provided for on the tool machine. As a result, the tool machine can be developed to be compact and affordable.

The real total energy intake can be calculated by simply recording the required real electrical power, for example.

"Virtual" is understood such that no physical object or component is used, rather a calculation based on existing measurement systems and a real-time simulation acts as a virtual sensor.

Using the process defined by the invention, the forces acting on the tool holder, in particular radial forces, can be measured at any time whilst the machine program is running. This can be performed when a change is made to the machine program or in real time, for example.

High radial forces occur on the tool holder when the tool holder or the tool attached to the tool holder is driven against an obstacle, e.g. the workpiece. With a properly configured machine program, the material of the workpiece exposed to the tool is ablated by the rotation of the tool, whereby the radial forces acting on the tool holder are minimal.

When further developing the process, therefore, it proves advantageous for the time-dependent virtual energy intake to comprise at least the sum of the calculated, time-dependent, virtual energy intake of the workpiece holder when idling, in particular when not processing the workpiece, across one or more steps of the machine program cycle, and the time-dependent, virtual energy intake of processing a workpiece across one or more steps of the machine program cycle.

In such case, the machine program may be observed separately both during idling and during workpiece processing.

Furthermore, in developing the latter process further it is intended that the time-dependent, virtual energy intake during idling across one or more steps of the machine program cycle can be calculated using the required mechanical energy of at least one idling drive axle, in particular without workpiece processing, or from at least one machine efficiency level for mechanical energy, and/or that the time-dependent virtual energy intake during idling can be calculated across one or more steps of the machine program cycle using the virtual heat dissipation corresponding to the mechanical energy of at least one idling drive axle.

By calculating the mechanical energy and the corresponding heat dissipation, it is easy for the control unit to calculate what the energy intake looks like at least for the drive axle when converting mechanical and thermal energy.

Increased radial forces occur in particular when process parameters are not properly configured. These result in particular from an unfavorable ratio of the RPM and/or feed speed of the tool or tool holder to the material volume of the workpiece ablated. RPM and feed speed can be measured and configured on the machine at any time.

On known tool machines, the material volume of the workpiece ablated is not generally calculated. In such case, it proves advantageous during further development of the process for the time-dependent, virtual energy intake of workpiece processing to comprise time-dependent, virtual material ablation of the workpiece across one or more steps of the machine program cycle multiplied by the virtual energy intake required for this per volume of workpiece ablated.

The energy required for the material ablation is proportional to the volume ablated. In developing the process further, therefore, it is intended that it be possible to save and adjust virtual material ablation and the virtual energy intake required for this per volume of the workpiece ablated in a storage medium of the control unit, and that it be possible to retrieve such for calculating virtual total energy intake.

In such case, the volume ablated and the energy intake required for this per volume ablated can be saved in the storage medium and estimated using the control unit.

Furthermore, in developing the latter inventive concept further, it is intended that it be possible to configure and individually adjust the material ablations saved in the storage medium or control unit and the virtual energy intake required for this per volume ablated. The prediction can thus be improved from one machine program cycle to the next.

Furthermore, in developing the process further it is intended that the time-dependent, virtual energy intake of workpiece processing additionally comprise multiplication by a material variable or material constant of the workpiece.

This can further improve the result of the total virtual energy intake calculated. The material constants allow linear relations to be depicted easily. The material variables allow even complex relations to be reproduced.

The result can be further improved if the calculation by the control unit of the radial forces acting on the tool holder, calculated as at least the difference between time-dependent, real total energy intake and time-dependent, virtual total energy intake, additionally includes calibration using a machine-specific calibration factor or a calibration function.

The calibration factor allows linear relations to be depicted easily. The calibration function allows even complex relations to be reproduced.

In such case, the process defined by the invention, that is generally applicable to tool machines, can be individually optimized for each individual tool machine.

It proves advantageous for the recording of at least the body data, room data, and operating data by a sensor in the control unit to include manual archiving in the control unit, in particular in the control unit's storage medium, and/or automatic archiving from the machine program.

If recording of at least body data, room data, and operating data is performed by at least one sensor, the process can be fully automated. If the recording of at least body data, room data, and operating data includes manual archiving in the control unit, there is no need for an additional sensor. If the recording of at least body data, room data, and operating data includes automatic archiving from the machine program, the process can be set up and performed on the tool machine quickly.

So as to be able to calculate the total virtual energy intake better, it is intended during further development of the process to approximate the geometry of the recorded body data of the tool and/or tool holder using virtual auxiliary geometry from a number of N auxiliary elements and/or to approximate the geometry of the workpiece using a scatter plot in a Cartesian coordinate system, the individual points of which are spaced at regular intervals from one another and which form, in particular, a regular or irregular matrix.

Using a regular matrix makes subsequent data processing easier. It is furthermore conceivable that the individual points will form an irregular matrix. In such case, it is possible to refine the process in order to make it possible, in particular, to take into account the stochastic material properties.

This allows the real geometry of the body data to be easily transferred from the tool, tool holder and workpiece to a virtual environment.

The auxiliary elements, for example, can be approximated using spheres in order to be able to utilize performant algorithms, which allows the intersection between the simplified tool geometries and the workpiece geometries to be calculated.

The distance between the points of the virtual scatter plot of the workpiece depicted in such a way represents the smallest possible unit volume of the workpiece that can be removed by the tool during processing of the workpiece by means of material ablation. In developing the latter process further, it is intended that the time interval between recording body data, room data, and operating data will be equal to or smaller than the distance between two points of the geometry of the workpiece approximated as a virtual scatter plot divided by the feed speed of the tool and/or tool holder, and/or that the time interval will comprise the timespan of one step of the virtual simulation of the machine program.

This allows a time interval and timespan of one step of the virtual simulation of the machine program to be defined in an easy manner, whereby the process will produce optimal results. In such case, the process steps named individually at the outset, in particular steps a. to e., can be repeated at these time intervals.

In order to keep the virtual environment up-to-date when calculating the virtual simulation of the machine program, it proves advantageous for the time-dependent, virtual material ablation of the workpiece, in the virtual simulation, to comprise all such points of the workpiece's virtual scatter plot which overlap during the timespan with the auxiliary elements which make up the virtual auxiliary geometry of the tool, and for the virtual geometry of the workpiece to be adjusted by removing those points of the virtual scatter plot which overlap with the auxiliary elements of the tool.

In such case, the body data recorded at the outset, at least those of the workpieces, are virtually adjusted.

Furthermore, the task is solved by using a virtual sensor to determine the condition of a tool holder, such as a spindle, or a tool machine which can be operated using a process with at least one of the aforementioned characteristics and work steps, with at least one tool holder, with at least one tool attached or attachable to the tool holder, by means of which a workpiece can be processed by running a machine program, and with at least one control unit comprising at least one sensor which can be used to measure time-dependent, total real energy intake and to calculate time-dependent, total virtual energy intake, whereby the radial forces acting on the tool holder can be calculated using the control unit at least as the difference between total real energy intake and time-dependent, total virtual energy intake.

Finally, the task is solved by a tool machine which comprises at least one virtual sensor with at least one of the aforementioned characteristics, and/or which can be operated using a process with at least one of the aforementioned characteristics or steps.

BRIEF DESCRIPTION OF THE DRAWINGS

Further characteristics, details and advantages of the invention can be found in the enclosed patent claims, the graphic illustration, and the following description of preferred embodiments of the process.

The illustration shows.

DETAILED DESCRIPTION OF THE INVENTION

Figure 1:
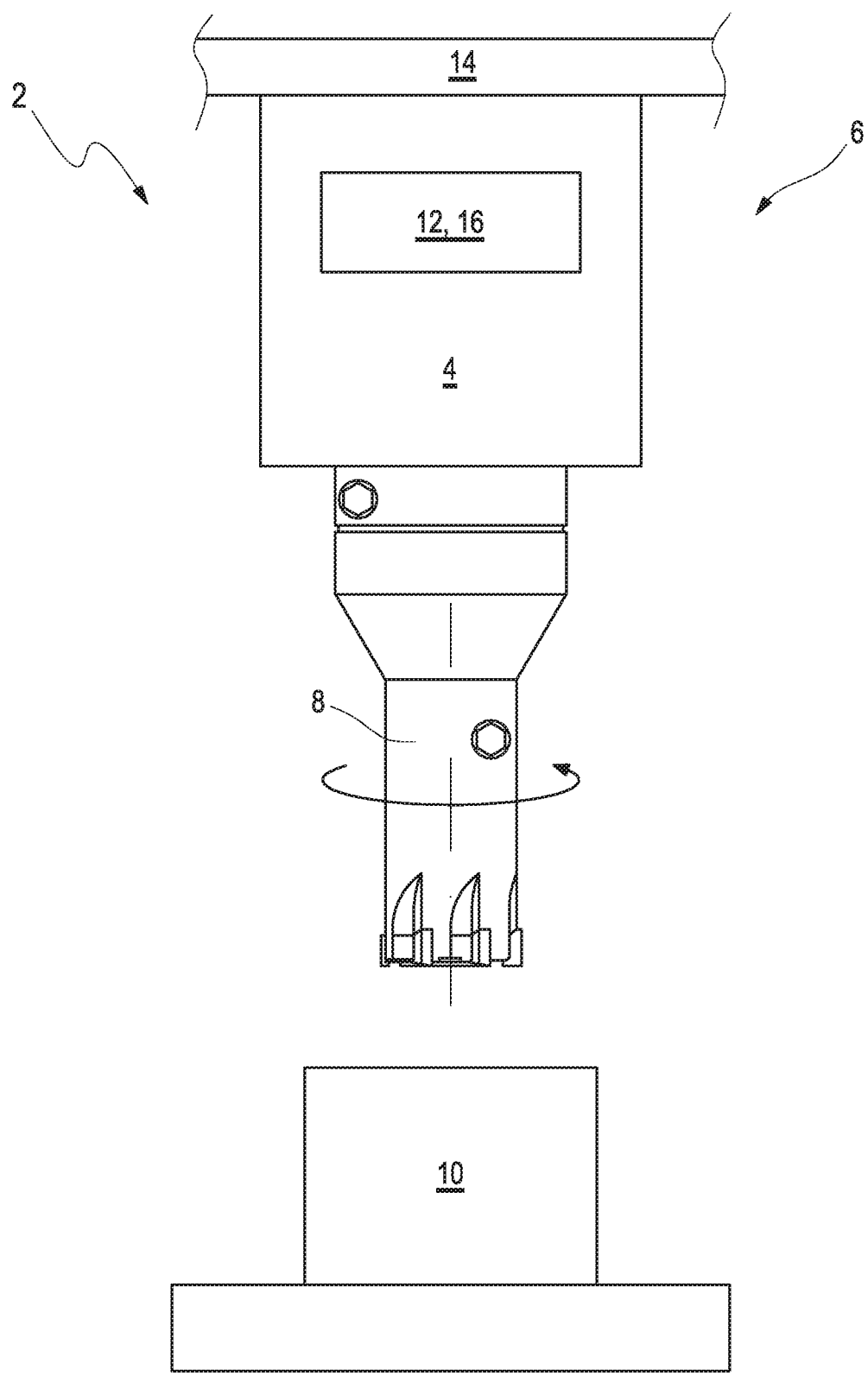
FIG. 1 A schematic sideview of a virtual sensor of a tool machine.

FIG. 1 shows a schematic sideview of a virtual sensor labelled as a whole with reference numeral 2. This serves to define the condition of a tool holder 4, such as a spindle, clamp, grip, etc., of a tool machine 6 (only partial area presented in FIG. 1). The tool machine 6 comprises the tool holder 4 and also a tool 8 which allows a workpiece 10 to be processed by running a machine program stored in a control unit 12. Moreover, the tool machine 6 comprises at least one sensor 16 which allows time-dependent, real total energy intake, e.g., an ammeter, voltmeter, electrical or power measurement systems, etc., to be recorded by the virtual sensor 2 and to be calculated using time-dependent, virtual total energy intake.

Figure 2:
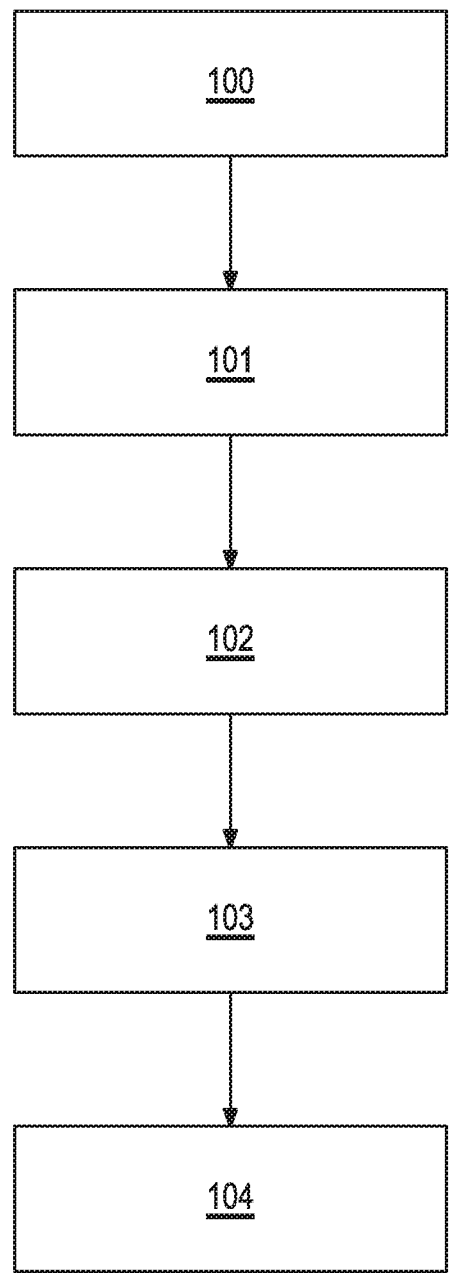
FIG. 2 A schematic flow chart of a process according to the invention.

FIG. 2 shows a schematic flow chart. The process for operating a virtual sensor 2 for determining the condition of a tool holder 4 of a tool machine 6 is described below under reference to the components of the tool machine 6 depicted in FIG. 1. A machine program can be run on the tool machine 6. Here, the process comprises an initial step 100, in which in particular a time-dependent piece of body data of the workpiece 10, of the tool 8, of the tool holder 4, and/or of at least one drive axle 14 can be recorded. This piece of body data may relate to a material and/or geometry, for example. In particular, the recorded geometry of the body data for the tool 8 and/or the tool holder 4 can be approximated in the step 100 using virtual auxiliary geometry from a number of N auxiliary elements, and/or the geometry of the workpiece 10 can be approximated using a virtual scatter plot in a Cartesian coordinate system, the individual points of which are spaced at regular intervals from one another and which, in particular, form a regular matrix.

In a subsequent step 101, the time-dependent room data of the workpiece 10, of the tool 8, of the tool holder 4, and/or of at least one drive axle 14 are recorded. The room data may comprise a position and/or orientation relative to an initial coordinate origin of the tool machine, for example.

In a subsequent step 102, at least one piece of time-dependent operating data, such as feed speed, RPM or rotational speed of the tool holder 4, and/or a least one electrical current, in particular one generating a moment, of the tool holder 4 and/or of at least one drive axle 14 can be recorded. By recording the feed speed, it is possible to additionally record a time interval—in step 102, for example—within which the steps to be performed in the process are repeated. The time interval is calculated such that the distance between two points comprises the geometry of the workpiece 10 approximated as a virtual scatter plot, divided by the feed speed of the tool 8 and/or of the tool holder 6. This allows the accuracy of the process to be improved.

Moreover, the time-dependent real total energy intake of one or more steps in the machine program can be recorded in a further step 103 using a least one of the control unit's 12 sensors 16, and the time-dependent, virtual total energy intake of one or more steps can be calculated using a virtual simulation of the machine program with the control unit 12 based on the body data, room data, and operating data recorded. For example, as well as the data recorded and calculated, calibration can be optimized by means of a machine-specific calibration factor, and/or multiplication of the virtual, time-dependent energy intake calculated for workpiece processing can be optimized by means of a material constant or material variable.

In a subsequent step 104, the radial forces acting on the tool holder 4 can be recorded or calculated, at least as the difference between time-dependent real total energy intake and time-dependent virtual total energy intake with the control unit 12.

Such information from the virtual sensor is then used to estimate the condition of the workpiece, tool, toolholder, etc., in order to adjust the processing of the workpiece and removal of the same when complete.

The characteristics of the invention disclosed in the above description, in the claims, and in the illustration may be essential both individually and in any combination to the realization of the invention in its various embodiments.

LIST OF REFERENCE NUMERALS

2 Virtual sensor
4 Tool holder
6 Tool machine
8 Tool
10 Workpiece
12 Control unit
14 Drive axle
16 Sensor
100—
104 Process steps

The invention claimed is:

1. A process for operating a virtual sensor for determining a condition of a tool holder on a tool machine and a of a tool machine which has at least one tool holder and at least one tool, attached or attachable to the least one tool holder, the tool machine allowing a workpiece to be processed by running a machine program, and the tool machine having at least one control unit comprising at least one sensor, the process for operating the virtual sensor having following steps:

recording at least one time-dependent, piece of body data of the workpiece, the at least one tool, the at least one tool holder, and/or at least one drive axle;

recording at least one piece of time-dependent room data of the workpiece, the at least one tool, the at least one tool holder, and/or the at least one drive axle;

recording at least one piece of time-dependent operating data, and/or recording a least one electrical current of the at least one tool holder and/or of the at least one drive axle;

recording a time-dependent real total energy intake of one or more steps in the machine program using at least one of the control unit's sensors, and calculating a time-dependent, virtual total energy intake of one or more steps using a virtual simulation of the machine program with the control unit based on the body data, room data, and operating data recorded; and recording or calculating radial forces acting on the at least one tool holder, at least as the difference between the time-dependent real total energy intake and the time-dependent virtual total energy intake with the control unit.

2. The process according to claim 1, wherein the time-dependent virtual energy intake comprises at least a sum of the calculated, time-dependent, virtual energy intake of the workpiece holder when idling and not processing the workpiece, across one or more steps of a machine program cycle, and the time-dependent, virtual energy intake of processing a workpiece across the one or more steps of the machine program cycle.

3. The process according to claim 2, wherein the time-dependent, virtual energy intake during idling across the one or more steps of the machine program cycle is calculated using a required mechanical energy of at least one idling drive axle, or from at least one machine efficiency level for the required mechanical energy, and/or that the time-dependent virtual energy intake during idling is calculated across the one or more steps of the machine program cycle using virtual heat dissipation corresponding to the mechanical energy of the at least one idling drive axle.

4. The process according to claim 2, wherein the time-dependent, virtual energy intake of workpiece processing comprises time-dependent, virtual material ablation of the workpiece across the one or more steps of the machine program cycle multiplied by the virtual energy intake required for this per volume of workpiece ablated.

5. The process according to claim 4, wherein virtual material ablation and the virtual energy intake required for this per volume of the workpiece ablated is saved and adjusted in a storage medium of the control unit, and that such data is able to be retrieved for calculating virtual total energy intake.

6. The process according to claim 4, wherein the time-dependent, virtual energy intake of workpiece processing additionally comprises multiplication by a material variable or material constant of the workpiece.

7. The process according to claim 1, wherein the calculation by the control unit of the radial forces acting on the tool holder is calculated as at least the difference between time-dependent, real total energy intake and time-dependent, virtual total energy intake and additionally includes calibration using a machine-specific calibration factor or a calibration function.

8. The process according to claim 1, wherein the recording of at least the body data, the room data, and the operating data by the at least one sensor in the control unit includes manual archiving in the control unit's storage medium, and/or automatic archiving from the machine program.

9. The process according to claim 1, wherein an approximation of a geometry of the body data of the at least one tool and/or the at least one tool holder recorded using virtual auxiliary geometry from a number of N auxiliary elements and/or approximation of the geometry of the workpiece using a virtual scatter plot in a Cartesian coordinate system, the individual points of which are spaced at regular intervals from one another which form a regular or irregular matrix.

10. The process according to claim 9, wherein a time interval between recording the body data, the room data, and the operating data is equal to or smaller than a distance between two points of the geometry of the workpiece approximated as a virtual scatter plot divided by a feed speed of the at least one tool and/or the at least one tool holder, and/or that the time interval will comprise a timespan of one step of the virtual simulation of the machine program.

11. The process according to claim 9, wherein a time-dependent, virtual material ablation of the workpiece, in the virtual simulation, comprises all such points of the workpiece's virtual scatter plot which overlap during a timespan with the auxiliary elements which make up the virtual auxiliary geometry of the tool, and that the virtual geometry of the workpiece is adjusted by removing those points of the virtual scatter plot which overlap with the auxiliary elements of the tool.

12. A virtual sensor for determining the condition of a tool holder, or a tool machine which is operated using a process according to claim 1, with the at least one tool holder, with the at least one tool attached or attachable to the at least one tool holder, by means of which the workpiece is processed by running the machine program, and with the at least one control unit comprising the at least one sensor which is used to measure the time-dependent, real total energy intake and to calculate the time-dependent, virtual total energy intake, wherein the radial forces acting on the at least one tool holder is calculated using the control unit at least as the difference between the time dependent real total energy intake and the time-dependent, virtual total energy intake.

13. A tool machine which comprises at least one virtual sensor according to claim 12.

* * * * *